Oct. 31, 1944.  M. VON ARDENNE  2,361,722
ELECTRONIC MICROSCOPE
Filed July 10, 1941
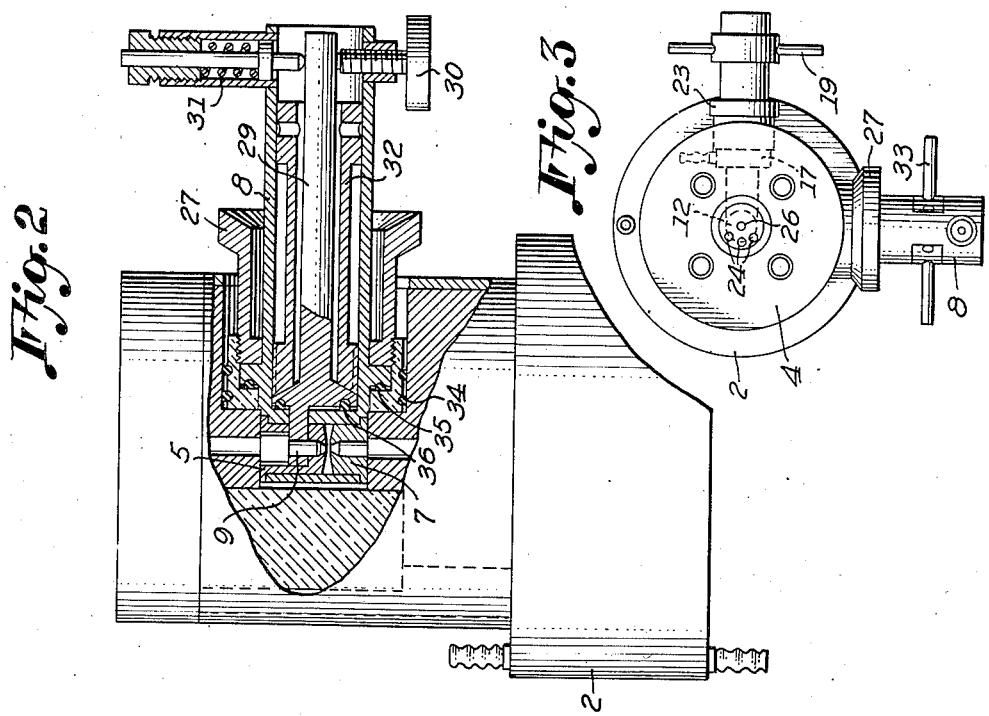
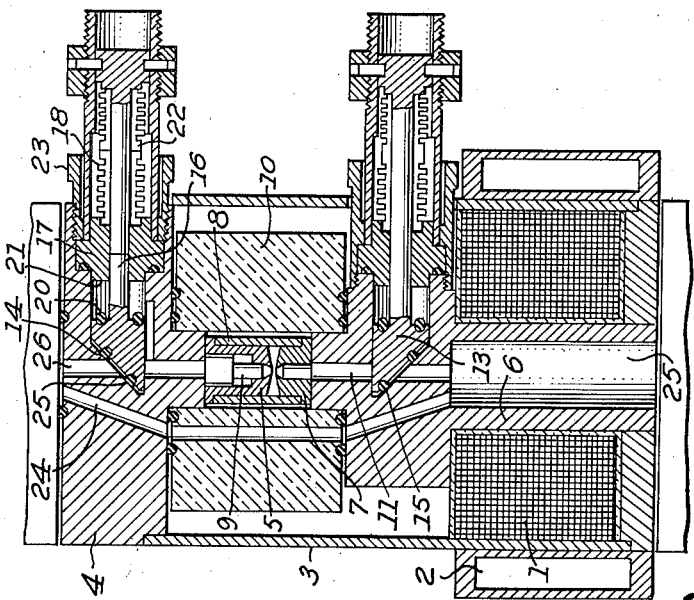
Inventor:
MANFRED VON ARDENNE
By Allen Holcombe
Attorney.

Patented Oct. 31, 1944

2,361,722

UNITED STATES PATENT OFFICE 2,361,722

ELECTRONIC MICROSCOPE

Manfred von Ardenne, Berlin-Lichterfelde, Germany; vested in the Alien Property Custodian Application July 10, 1941, Serial No. 401,813
In Germany May 9, 1940

4 Claims. (Cl. 250—49.5)

This invention relates to improvements in electronic microscopes, and more particularly to an object sluicing device for electronic microscopes.

The devices hitherto known for inserting and removing the objects in and from the vacuum chamber of electronic microscopes require greased sealing surfaces. To ensure a proper sealing, the ground surfaces must be greased from time to time.

The object of the present invention is to provide a sluicing device for objects to be introduced into the vacuum chamber of electronic microscopes, in which the greased sealing surfaces ar dispensed with so that it is no longer necessary to control the apparatus as to whether the vacuum chamber is vacuum proof. According to the invention the portion of the inner space of the microscope intended for the reception of the object may be disconnected from the other parts of the microscope by two sluice valves provided with rubber packings. The sluice chamber for the reception of the object cartridge is sealed by rubber packings so that greased ground surfaces may be entirely eliminated. The valve drive is preferably effected with the aid of a valve rod to be actuated exteriorly of the apparatus, the valve rod being in turn sealed by a resilient body. In order to keep the space in which a high vacuum is to prevail as small as possible, a second rubber packing, by means of which the space closed by the resilient body is separated from the vacuum chamber after the object has been sluiced into the vacuum chamber may be arranged according to the invention at the side away from the path of rays.

In the accompanying drawing is shown an embodiment of the invention in diagrammatic form. Fig. 1 shows a sectional view of a portion of an electronic microscope; Fig. 2 is an elevation of the portion of microscope illustrated in Fig. 1 but taken at a right angle thereto and with parts broken away and in section; and Fig. 3, is a plan view of the portion of the microscope shown in Figs. 1 and 2.

Referring to the drawing, 1 denotes the coil of the objective lens. Around the coil body is arranged a cooling water jacket 2. The objective is designed in the form of a pole shoe lens. One pole shoe is formed of the outer jacket 3, the upper cover 4 and the pole shoe end 5, whereas the other pole shoe is formed of the inner jacket 6 and the pole shoe end 7. The pole shoe ends 5 and 7 are combined in an interchangeable insert body. 9 denotes the object cartridge. The intermediate piece 10 between the parts 4 and 6 is made of any suitable non-magnetic material such as brass or glass. For the sake of clarity and to distinguish the non-magnetic piece 10 from magnetic portions of the microscope, the piece 10 has been illustrated in the drawing as made of glass. 11 is the inner space of the electronic microscope in which the object is inserted. The inner space 11 may be disconnected from the other parts of the microscope inner space with the aid of two valves 12, 13. The valves are provided with circular grooves 14 in which is arranged a rubber ring 15 serving to seal the inner space 11 against the upper and lower parts 26 and 25 of the vacuum chamber. With the valve closed as shown these rubber rings 15 seal the inner space 11. 16 denotes the valve rod serving for the drive of the valve body 12 and cooperating with the bushing 17. A resilient body 18 serves to seal the valve rod. The valve is opened and closed by operating the outer drive 19 (Fig. 3). The valve body 14 is provided at the side away from the path of the electron rays with a second rubber ring 20 which is in engagement when the valve is open with the sealing surface 21, thus sealing the space 22 enclosed by the resilient body 18 against the exhausted inner chamber of the electronic microscope. In this manner the space in which a high vacuum is to prevail may be kept particularly small. The bushing 17 is firmly held in position with the aid of the threaded sleeve 23. 24 denotes a channel which by-passes the space 11 and by means of which the space 25 and the space 26 of the electronic microscope lying respectively below and above the space 11 may be properly exhausted.

In Fig. 2 is shown the removable pole shoe insert body 8. This body is firmly held against the holding ring 28 by means of the pressure bushing 27. 29 denotes the cartridge holder which may be slightly brought out of alignment against the action of the spring 31 with the aid of an adjusting screw 30 so that an adjustment of different sections of the object is possible without influencing the adjustment of the optical system. The cartridge holder 29 may be firmly held in position in the pole shoe insert body 8 with the aid of the threaded sleeve 32 and of the rod 33 cooperating therewith.

Also in the case of removable pole shoe inserts rubber rings 34, 35 and 36 must be employed at convenient points for sealing the vacuum chamber against the outside atmosphere.

What is claimed is:

1. In an electron microscope, a body having a channel extending through it for the passage of an electron beam, said body having an opening in one side which terminates in an annular surface surrounding said channel, said surface making an acute angle with the axis of said channel and forming a valve seat, and a valve slidable in said opening and adapted to cooperate with said seat to close said channel.

2. In an electronic microscope, a body having a channel extending through it for the passage of an electron beam, said body having an opening in one side which intersects said channel, a closure member for said opening sealed to said body, a valve in said opening having a stem extending through an opening in said closure member, an operating member attached to the end of said stem and adapted to move the same longitudinally to close and open said valve, and an expansible and contractible envelope surrounding said valve stem and sealed at one end to said closure member and at the other end to said operating member.

3. In an electron microscope, a body having a channel extending through it for the passage of an electron beam, said body having an opening in one side terminating in a valve seat surrounding said channel, a closure member for said opening, a valve member provided with a stem extending through said closure member, a resilient seal between the closure member and valve stem to permit sliding of the valve member in said opening by means of said stem, a packing ring on said valve member cooperating with said valve seat in one position of said valve member to close said channel, and a second packing ring on the opposite side of said valve member cooperating with said closure member to seal the opening for the stem.

4. In an electron microscope, an evacuated passageway for a beam of electrons, two movable valves for closing said passageway, a separate valve stem connected to each valve and movable therewith, separate packing means carried by each valve for effecting a seal between the valve and the passageway when the valve is in its closing position and for sealing said passageway to communication with the atmosphere when the valve is in position to open the passageway, separate resilient diaphragm means surrounding each valve stem, each resilient diaphragm means being fixed at one end and attached at its other end to its respective valve whereby to seal off the valve and its valve stem from communication with the atmosphere, and means for introducing an object into said passageway at a point between said valves.

MANFRED VON ARDENNE.